US011258601B1

(12) United States Patent
Wang et al.

(10) Patent No.: US 11,258,601 B1
(45) Date of Patent: Feb. 22, 2022

(54) SYSTEMS AND METHODS FOR DISTRIBUTED DIGITAL RIGHTS MANAGEMENT WITH DECENTRALIZED KEY MANAGEMENT

(71) Applicant: Trend Micro Incorporated, Tokyo (JP)

(72) Inventors: Tai-An Wang, Taipei (TW);
Liang-Chih Chen, Taipei (TW);
Ting-Yin Yen, Taipei (TW); Yu-Shu Chen, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 332 days.

(21) Appl. No.: 16/430,827

(22) Filed: Jun. 4, 2019

(51) Int. Cl.
*H04L 9/08* (2006.01)
*G06N 20/00* (2019.01)

(52) U.S. Cl.
CPC ............ *H04L 9/088* (2013.01); *G06N 20/00* (2019.01)

(58) Field of Classification Search
USPC ........ 713/150, 163, 171, 181; 726/2, 21, 36; 380/255, 264, 276
See application file for complete search history.

(56) References Cited

U.S. PATENT DOCUMENTS

| | | | | |
|---|---|---|---|---|
| 5,764,765 | A * | 6/1998 | Phoenix | H04L 9/0858 380/256 |
| 6,748,083 | B2 * | 6/2004 | Hughes | H04B 10/70 380/260 |
| 7,437,081 | B2 * | 10/2008 | Mitchell | H04B 10/70 380/256 |
| 7,979,708 | B2 * | 7/2011 | Park | G06Q 20/1235 713/176 |
| 7,996,486 | B2 | 8/2011 | Lambert | |
| 8,750,523 | B2 * | 6/2014 | Robert | G11B 20/00731 380/286 |
| 8,855,316 | B2 * | 10/2014 | Wiseman | H04L 9/0855 380/278 |
| 9,960,465 | B2 * | 5/2018 | Dudley | H01M 10/6557 |
| 10,057,058 | B2 * | 8/2018 | Murakami | H04L 9/0858 |
| 2003/0004885 | A1 * | 1/2003 | Banerjee | G06Q 30/06 705/52 |
| 2003/0037253 | A1 * | 2/2003 | Blank | G06F 21/10 726/27 |
| 2004/0044779 | A1 * | 3/2004 | Lambert | G06F 21/10 709/229 |
| 2004/0088175 | A1 * | 5/2004 | Messerges | G06F 21/10 705/1.1 |

(Continued)

*Primary Examiner* — Sharif E Ullah
(74) *Attorney, Agent, or Firm* — Patrick D. Benedicto

(57) ABSTRACT

One embodiment disclosed relates to a system for digital data distribution with decentralized key management. The system utilizes a data provider, a data demander, cloud storage, a blockchain, and a smart contract registered with the blockchain. The data provider encrypts the digital data using a session key and puts the encrypted digital data to the cloud storage, which returns a URL for the stored digital data. In addition, the session key is itself encrypted using the public key of the data demander. The access data at the smart contract is updated with the encrypted session key and the URL. The data demander uses its own private key to decrypt the session key and then uses the session key to decrypt the digital data. Other embodiments and features are also disclosed.

10 Claims, 4 Drawing Sheets

(56) References Cited

U.S. PATENT DOCUMENTS

| | | | | |
|---|---|---|---|---|
| 2005/0138352 A1* | 6/2005 | Gauvreau | H04L 9/3247 | 713/153 |
| 2007/0065154 A1* | 3/2007 | Luo | H04J 14/0246 | 398/141 |
| 2007/0076884 A1* | 4/2007 | Wellbrock | H04L 9/0858 | 380/263 |
| 2007/0195774 A1* | 8/2007 | Sherman | H04L 69/16 | 370/392 |
| 2008/0235805 A1* | 9/2008 | Pfitzmann | G06F 21/105 | 726/27 |
| 2011/0131634 A1* | 6/2011 | Hamilton, II | G06Q 10/00 | 726/4 |
| 2011/0206204 A1* | 8/2011 | Sychev | H04J 14/0212 | 380/256 |
| 2011/0213979 A1* | 9/2011 | Wiseman | H04L 9/0855 | 713/171 |
| 2014/0010234 A1* | 1/2014 | Patel | H04L 45/74 | 370/392 |
| 2014/0068765 A1* | 3/2014 | Choi | H04L 63/1416 | 726/23 |
| 2014/0133652 A1* | 5/2014 | Oshida | H04L 9/0897 | 380/255 |
| 2015/0026452 A1* | 1/2015 | Roelse | H04L 9/14 | 713/150 |
| 2016/0085945 A1* | 3/2016 | Moshe | G06F 21/84 | 726/28 |
| 2016/0241396 A1* | 8/2016 | Fu | H04L 9/0836 | |
| 2016/0359626 A1* | 12/2016 | Fu | H04L 9/0858 | |
| 2016/0366094 A1* | 12/2016 | Mason | H04L 61/2038 | |
| 2016/0371804 A1* | 12/2016 | Yun | G06F 21/79 | |
| 2017/0214525 A1* | 7/2017 | Zhao | H04W 12/041 | |
| 2017/0230173 A1* | 8/2017 | Choi | H04L 9/0891 | |
| 2018/0176091 A1* | 6/2018 | Yoon | H04L 41/0896 | |
| 2019/0036821 A1* | 1/2019 | Levy | G06F 12/0868 | |
| 2019/0188360 A1* | 6/2019 | Park | H04L 67/306 | |
| 2019/0349392 A1* | 11/2019 | Wetterwald | H04J 3/0667 | |
| 2020/0084222 A1* | 3/2020 | William | H04L 9/0869 | |

* cited by examiner

SYSTEMS AND METHODS FOR DISTRIBUTED DIGITAL RIGHTS MANAGEMENT WITH DECENTRALIZED KEY MANAGEMENT

BACKGROUND OF THE INVENTION

1. Field of the Invention

The present disclosure relates generally to digital rights management.

2. Description of the Background Art

Digital Rights Management (DRM) refers to the technology used for the protection of digital media content, typically audio or video. DRM works by encrypting the content before distribution, and by limiting access to only those end-users who have acquired a proper license to play the content.

SUMMARY

Embodiments disclosed relate to a system and methods for distributed DRM with decentralized key management. The system utilizes a data provider, a data demander, cloud storage, a blockchain, and a smart contract registered with the blockchain. The data provider encrypts the digital data using a session key and puts the encrypted digital data to the cloud storage, which returns a URL for the stored digital data. In addition, the session key is itself encrypted using the public key of the data demander. The access data at the smart contract is updated with the encrypted session key and the URL. The data demander uses its own private key to decrypt the session key and then uses the session key to decrypt the digital data.

Other embodiments relate to methods for distributed DRM with decentralized key management. A smart contract is registered on a blockchain by a data provider system. The smart contract comprises a recorder for updating access data and a checker for verifying access authorization. A session key is generated the data provider system, and a digital data asset is encrypted with the session key by the data provider system to generate an encrypted digital data asset. The encrypted digital data asset is put from the data provider system to a cloud storage system, and a URL for the encrypted digital data asset is received by the data provider system from the cloud storage system. After access rights to the digital data asset are obtained by a data demander, the session key may be encrypted by the data provider using a public key of the data demander, and an access list may be updated at the smart contract with the encrypted session key and the URL. The smart contact may then be checked to verify that the data demander is authorized to access the digital data asset, and, upon verification of authorization, the universal resource locator and the encrypted session key may be provided from the smart contract to the data demander.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

The presently-disclosed system and methods relate to distributed DRM (digital rights management) with decentralized key management and may be applied to transactions of notarized data over a data exchange platform, such as a public blockchain. The data may be sold over the platform by a data provider. For example, the data provider may be a data generator, a data reseller, or a data broker. The data sold may be, for example, data from the Internet-of-Things which is post-processed by artificial intelligence or machine learning, for instance.

However, using traditional DRM for these purposes introduces the problem that the key management for the DRM may be hosted by an untrusted party. The presently-disclosed solution provides key management using public/private key encryption and decryption that is coordinated by a smart contract on a trusted blockchain.

The presently-disclosed solution integrates certain aspects of traditional DRM with useful features of distributed blockchain technology. An access control method is provided for accessing protected data which has been notarized on a public blockchain. Access to the data is limited to authorized users, while providing for data privacy and data integrity. A hash of the data (and possibly other metadata) is put onto the public blockchain, and an access list is recorded in the smart contract. The state of the access list may be changed or updated, and all such modifications are logged as transactions in the blockchain.

Unlike traditional DRM, there is no need to have a centralized authority for key management. Instead, a provider's blockchain private key is used to sign data, and a demander's blockchain public key is used to encrypt the data. This substitutes for the traditional asymmetric cryptographic system and only needs to check authentication in the smart contract. This technique not only provides access control, but it also ensures that the data is originated from the data provider without influence by a central authenticator center or third-party content security policy.

System for Distributed DRM with Decentralized Key Management

Figure 1:
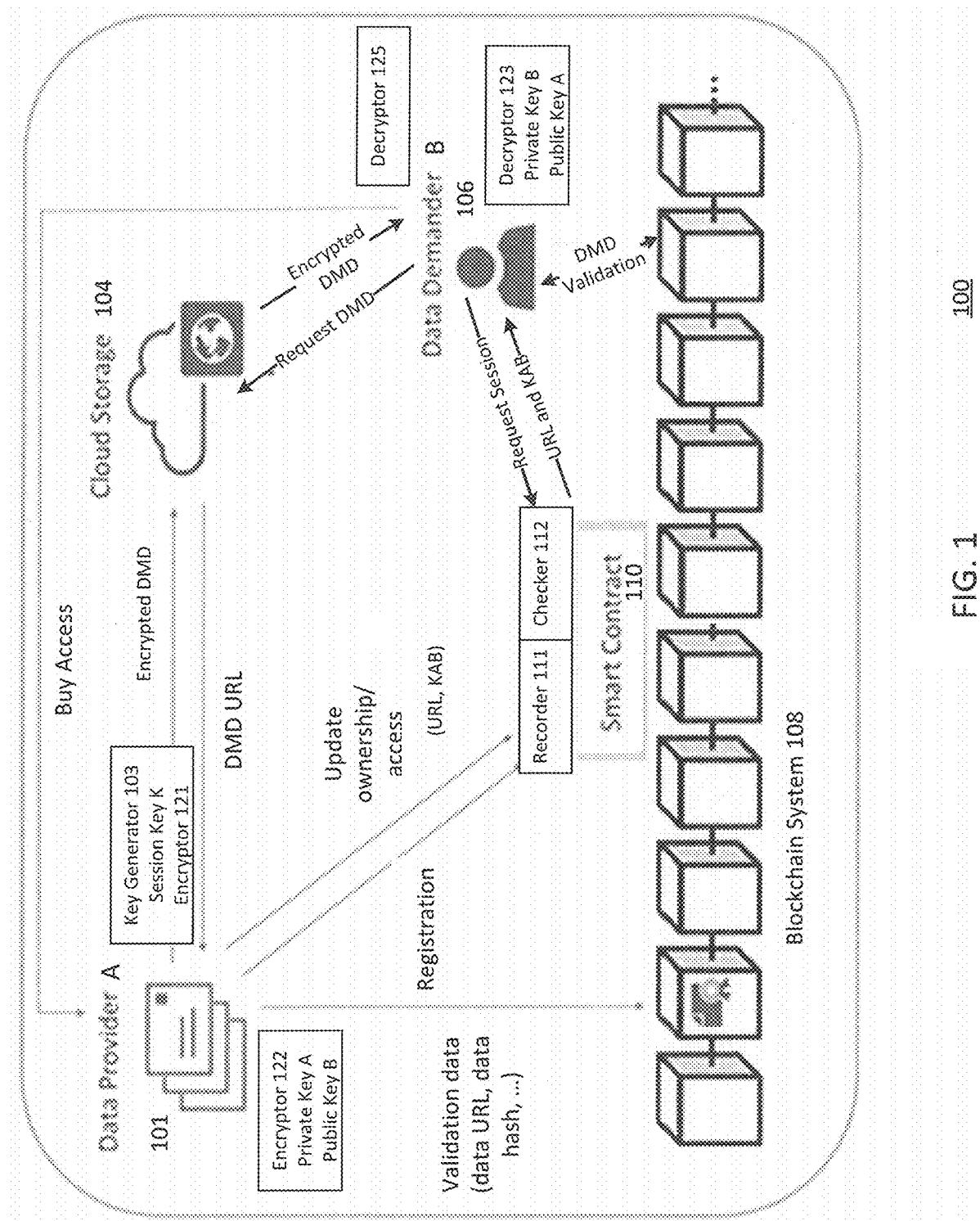
FIG. 1 depicts a system of distributed DRM with decentralized key management in accordance with an embodiment of the invention.

FIG. 1 depicts a system 100 for distributed DRM with decentralized key management in accordance with an embodiment of the invention. The system 100 provides digital rights management in a distributed manner using a smart contract on a blockchain As depicted, the system 100 includes a data provider (A) 101, cloud storage system 104, data demander (B) 106, and blockchain system 108. The system 100 utilizes a smart contract 110 which may be recorded on the blockchain of the blockchain system 108.

The data provider system (A) 101 utilizes a key generator 103 to generate a session key K, and an encryptor 121 to encrypt a DMD object (or other digital data) using the session key K. The data provider system (A) 101 also includes an encryptor 122 to encrypt the session key K using the private key of the data provider A and the public key of the data demander B so as to generate the encrypted session key KAB.

The data demander (B) 106 utilizes a decryptor 123 to decrypt the encrypted session key KAB using the public key of the data provider A and the private key of the data demander B so as to obtain the session key K. The session key K may then be used by decryptor 125 to decrypt the encrypted DMD object and so obtain the DMD object.

The blockchain of the blockchain system 108 is used as a distributed ledger to store information. The validity of the entries in the blockchain are confirmed as valid by the system 108 utilizing a decentralized consensus-based process. In other words, the system 108 authoritatively determines the integrity of the blockchain by the consensus of nodes of its decentralized network.

The smart contract 110 is a script that runs on top of the blockchain system 108. The smart contract 110 has a set of agreed-upon rules such that, if someone triggers the function and the condition of rules are met, the smart contract executes the pertinent code. As depicted, the smart contract 110 includes a recorder 111 and checker code 112, both implemented in executable code.

Although one data provider 101 and one data demander 106 are depicted for ease of illustration and explanation, it is contemplated that the system 100 may be utilized by multiple data providers 101 and multiple data demanders 106. Furthermore, while FIG. 1 depicts controlled access to a single digital media data (DMD) object utilizing a single session key K for ease of illustration and explanation, it is contemplated that the system 100 may use multiple session keys K and provide controlled access to multiple DMD objects.

Figure 2:
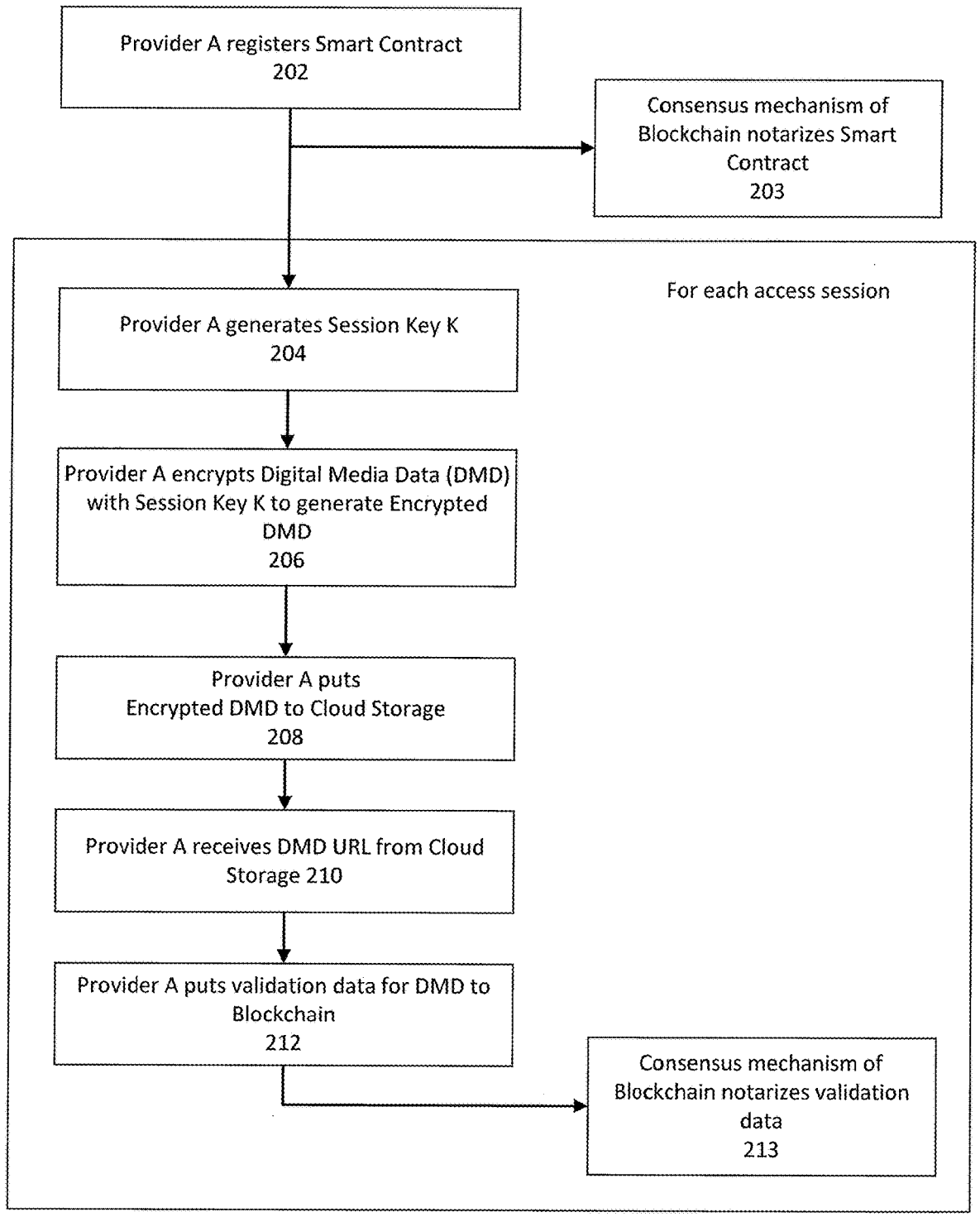
FIGS. 2 and 3 depict methods of operating the distributed DRM system in accordance with an embodiment of the invention.
Figure 3:
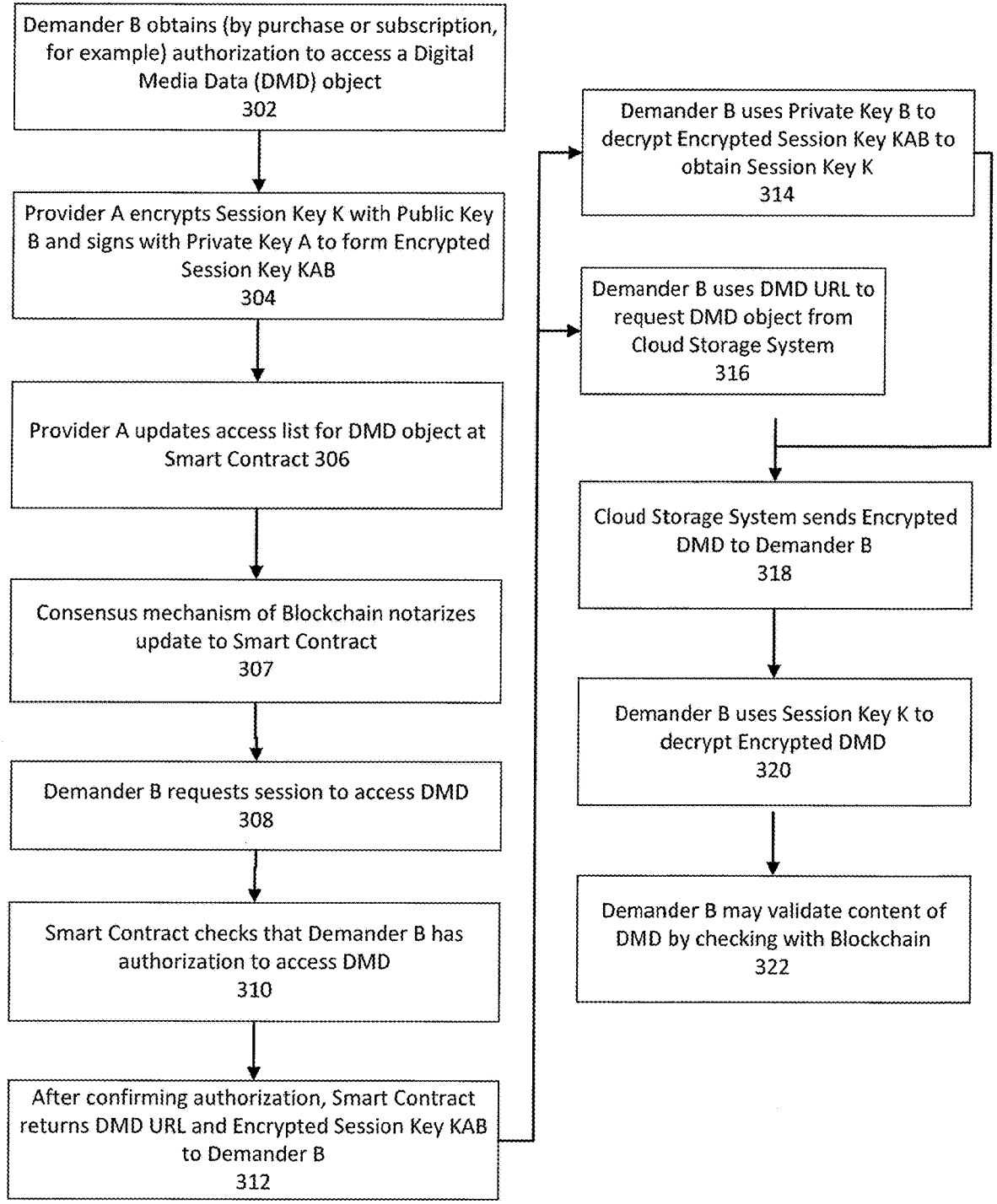

FIGS. 2 and 3 depict methods of operating the system for distributed DRM with decentralized key management in accordance with an embodiment of the invention. In particular, a method 200 of storing and preparing the digital data for controlled access with decentralized key management is depicted in FIG. 2, and a method 300 of controlled access to the digital data using the decentralized key management is depicted in FIG. 3.

Storing Digital Data and Preparing System Components for Controlled Access with Decentralized Key Management Referring to FIG. 2, the method 200 of storing the digital data and preparing system components for controlled access with decentralized key management is driven by the data provider (A) 101. Two initial steps 202 and 203 relate to a data provider 101 registering a smart contract 110 for controlling access to DMD (or other digital data) objects.

Per step 202, the data provider (A) 101 registers a smart contract 110. The smart contract 110 controls access to one or more DMD objects and is registered using the blockchain of the blockchain system 108. As depicted in FIG. 1, the smart contract 110 includes a recorder 111 for the data provider to update ownership/access metadata in the smart contract 110 and checker code 112 for checking access rights of data demanders, both implemented in executable code. Per step 203, the smart contract 110 is notarized using the consensus mechanism of the distributed network of the blockchain system 108.

After the smart contract 110 is registered, steps 204 through 213 may be performed for each access session.

Per step 204, the data provider (A) 101 uses key generator 103 to generate a session key K. The session key K is a symmetric key for encryption and decryption. Per step 206, the session key K is used by the encryptor 121 to encrypt the DMD object so as to generate an encrypted DMD object. The encrypted DMD object is put to cloud storage 104 per block 208. In response, per block 210, the data provider (A) 101 receives from the cloud storage system 108 a universal resource locator (URL) for the DMD object as stored in the cloud storage.

After receiving the URL, the data provider (A) 101 puts validation data for the DMD object to the blockchain system 108 per step 212. The validation data may include: the URL for the DMD object as stored in the cloud storage; a hash of the data of the DMD object for content verification; and other hashes and metadata.

Per step 213, the validation data is notarized using the consensus mechanism of the distributed network of the blockchain system 108. The notarization is performed by storing the validation data in an entry in a block added to the blockchain. The block is then subsequently confirmed as valid by the decentralized consensus-based process of the blockchain system 108. This effectively notarizes the veracity of the validation data.

Controlled Access to Digital Data Using Decentralized Key Management

Referring to FIG. 3, the method 300 of controlled access to digital data with decentralized key management is shown. In particular, the method 300 relates to data demander (B) 106 accessing a DMD (or other digital data) object stored in the system 100 per the method 200 of FIG. 2.

Per step 302, data demander (B) 106 obtains access rights to (i.e. authorization to access) the DMD object. The access rights may be obtained, for example, by purchase of a license. For example, if the DMD object is a movie from the data provider (A) 101, then the data demander (B) 106 may purchase a one-time viewing license of the movie by way of a video streaming service. As another example, a collection of movies and video shows of the data provider (A) 101 may be subscribed to by the data demander (B) 106 for a period of time. As another example of data which is not digital media, a corporate user may obtain a license to use data generated by an artificial intelligence or machine learning company.

Per step 304, once data demander (B)106 has obtained access rights to the DMD object (or other digital data), the data provider (A) 101 uses an encryptor 122 to encrypt a session key K with the public key B of the data demander (B) 106 and signs with its own private key A. This results in an encrypted session key KAB. The session key K is the encryption key used to encrypt the DMD object before sending it to cloud storage as discussed above in relation to FIG. 2.

Per step 306, the data provider (A) 101 updates an access list for the DMD object at the Smart Contract 110. The update data sent includes the URL of the DMD object and identifying information for the data demander (B) 106, along with the encrypted session key KAB. Performing the update involves putting the update data to the blockchain. Per step 307, the update is notarized by the consensus mechanism of the blockchain system 108.

With the update having been performed, the data demander (B) 106 may then, per step 308, send a request to the smart contract 110 for access to the DMD object. Per step 310, the smart contract 110 responds to the request by checking whether the data demander (B) 106 is authorized to access to the requested data. (If the data demander (B) 106 is not authorized, then a responsive message so indicating may be returned to the data demander (B) 106.) Upon confirming authorization, the smart contract 110 returns, per step 312, the URL of the DMD object, along with the encrypted session key KAB to the data demander (B) 106.

Per step 314, the data demander (B) 106 confirms that the data provider (A) 101 signed the encrypted session key KAB using the provider's public key A and uses its own private key B to decrypt the encrypted session key KAB to obtain the session key K. In addition, per step 316, the data demander (B) 106 uses the URL to request the DMD object from the cloud storage system 106.

In response, per step 318, the cloud storage system 104 sends the encrypted DMD object to the data demander (B) 106. In one implementation, the encrypted DMD object may be sent by streaming the content. In another implementation, the encrypted DMD object may be sent by downloading the content.

Per step 320, the data demander (B) 106 uses the session key K to decrypt the encrypted DMD object, either as it is being streamed, or after it is downloaded, such that the DMD object may be viewed, or heard, or read, by an end user. Note that the data demander (B) 106 must obtain both the encrypted DMD object and the session key K in order to obtain the DMD object. Finally, per step 322, the data demander (B) 106 may validate the content of the DMD object by checking with the validation data on the validation data previously recorded and notarized on the blockchain per steps 212 and 213 in FIG. 2.

Application to Other Digital Data Types

The above description uses digital media data (such as, for example, MP3 files, MOV files, and so on) as an example of data which may be controllably distributed. Digital media data includes, for example, video files (e.g., MOV files), audio files (e.g., MP3 files), photo files (e.g., JPEG files), and so on.

However, other types of digital data may also be controllably distributed using the presently-disclosed system and methods. For example, the data may be data from an Internet-of-Things (IoT) application. For instance, the operator of a factory may need to regularly submit air and/or water pollution data for a government agency to audit. In this case, the operator may need a trustable certificate, such as one validated by a public blockchain or by a certificate authority (CA) solution.

Computer System

Figure 4:
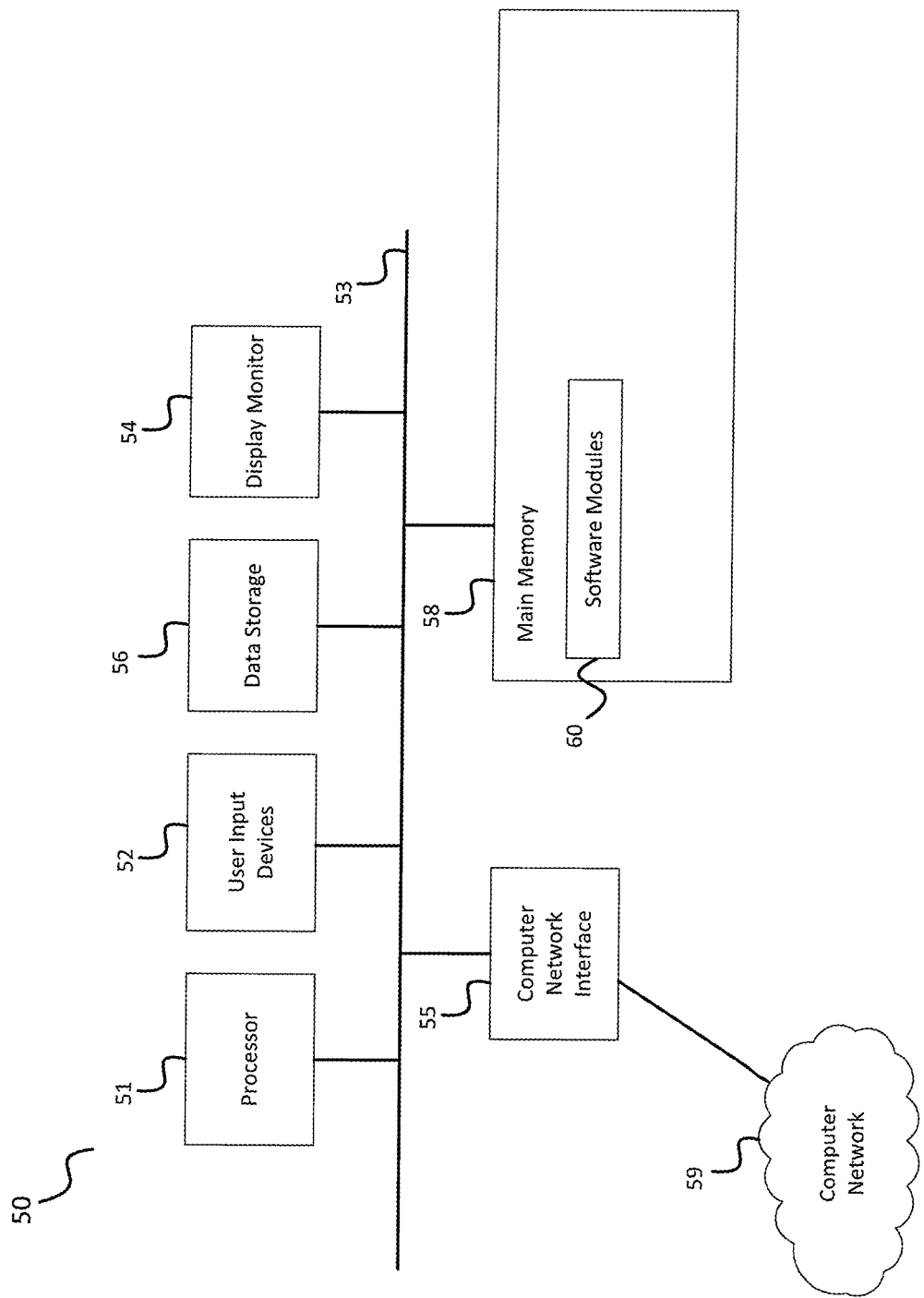
FIG. 4 is a logical diagram of a computer system in accordance with an embodiment of the present invention.

Referring now to FIG. 4, there is shown a logical diagram of a computer system 50 in accordance with an embodiment of the present invention. The computer system 50 may be employed as a network security device, a client device, or a cloud security system, for example. The computer system 50 may have fewer or more components to meet the needs of a particular application. The computer system 50 may include one or more processors 51. The computer system 50 may have one or more buses 53 coupling its various components. The computer system 50 may include one or more user input devices 52 (e.g., keyboard, mouse), one or more data storage devices 56 (e.g., hard drive, optical disk, solid state drive), a display monitor 54 (e.g., liquid crystal display, flat panel monitor), a computer network interface 55 (e.g., network adapter, modem), and a main memory 58 (e.g., random access memory). The computer network interface 55 may be coupled to a computer network 59.

The computer system 50 is a particular machine as programmed with one or more software modules, comprising instructions stored non-transitory in the main memory 58 for execution by the processor 51 to cause the computer system 50 to perform corresponding programmed steps. An article of manufacture may be embodied as computer-readable storage medium including instructions that when executed by the processor 51 cause the computer system 50 to be operable to perform the functions of the one or more software modules 60. Such a computer system 50 may be used to implement various devices and apparatus in the systems depicted in the prior figures and described herein.

Conclusion

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method for distributed digital rights management with decentralized key management, the method comprising:

registering a smart contract on a blockchain by a data provider system, wherein the blockchain is maintained by a network of nodes of a blockchain system, and wherein the smart contract comprises a recorder for updating access data and a checker for verifying access authorization;

generating a session key by a key generator of the data provider system;

encrypting a digital data asset with the session key by a first encryptor of the data provider system to generate an encrypted digital data asset;

putting the encrypted digital data asset from the data provider system to a cloud storage system;

receiving a universal resource locator for the encrypted digital data asset by the data provider system from the cloud storage system;

notarizing at least the universal resource locator and a hash of the digital data asset by the data provider system using the blockchain system;

obtaining access rights to the digital data asset by a data demander system from the data provider system; and encrypting the session key by the data provider system using a public key of the data demander system so as to obtain an encrypted session key.

2. The method of claim 1 further comprising:

updating access data at the smart contract by the data provider system with the universal resource locator and the encrypted session key.

3. The method of claim 2 further comprising:

requesting by the data demander system a session to access the digital data asset;

checking by the smart contract to verify that the data demander system is authorized to access the digital data asset; and upon verification of authorization, providing the locator and the encrypted session key from the smart contract to the data demander system.

4. The method of claim 3 further comprising:

using the universal resource locator by the data demander system to get the digital data asset from the cloud storage system; and decrypting the session key by the data demander system using its own private key.

5. The method of claim 4 further comprising:

receiving the encrypted digital data asset by the data demander system from the cloud storage system; and decrypting the encrypted digital data asset by the data demander system using the session key to obtain the digital data asset.

6. A method of distributed digital rights management using decentralized key management coordinated by a smart contract on a blockchain, the method comprising:

registering a smart contract on a blockchain;

generating a session key by a key generator of a data provider;

encrypting a digital data asset with the session key;

storing the encrypted digital data asset in a cloud storage;

notarizing, using the blockchain, at least a universal resource locator for the encrypted digital data asset as stored in the cloud storage;

encrypting the session key by the data provider using a public key of a data demander so as to obtain an encrypted session key;

updating access data at the smart contract registered on the blockchain by the data provider with the encrypted session key and the universal resource locator for the digital data asset;

requesting access to the digital data asset by the data demander;

checking by the smart contract to verify that the data demander is authorized to access the digital data asset; and upon verification of authorization, providing the universal resource locator and the encrypted session key from the smart contract to the data demander.

7. The method of claim 6 further comprising:

using the universal resource locator by the data demander to get the encrypted digital data asset from the cloud storage; and decrypting the session key by the data demander using its own private key.

8. The method of claim 7 further comprising:

receiving the encrypted digital data asset by the data demander from the cloud storage; and decrypting the encrypted digital data asset by the data demander using the session key to obtain the digital data asset.

9. The method of claim 8, wherein the digital data asset comprises digital media data.

10. The method of claim 8, wherein the digital data asset comprises Internet-of-Things data as post-processed by artificial intelligence or machine learning.

* * * * *